United States Patent [19]

Tanaka

[11] Patent Number: 5,307,339
[45] Date of Patent: Apr. 26, 1994

[54] TRANSLATING APPARATUS FOR AN OPTICAL PICKUP DEVICE

[75] Inventor: Kazuhiro Tanaka, Tokyo, Japan

[73] Assignee: Sony Corporation, Tokyo, Japan

[21] Appl. No.: 932,646

[22] Filed: Aug. 20, 1992

[30] Foreign Application Priority Data

Aug. 27, 1991 [JP] Japan .................................. 3-240356

[51] Int. Cl.⁵ .............................................. G11B 19/00
[52] U.S. Cl. .................... 369/215; 369/219; 74/89.17
[58] Field of Search ............... 369/215, 219, 244, 220; 74/89.17

[56] References Cited

U.S. PATENT DOCUMENTS

| | | | |
|---|---|---|---|
| 4,152,728 | 5/1979 | Camerik | 358/128 |
| 4,686,665 | 8/1987 | Kamoshita | 369/215 |
| 4,807,219 | 2/1989 | Kyohya | 369/220 |
| 5,008,876 | 4/1991 | Nakagishi | 369/219 |
| 5,025,371 | 6/1991 | Heinrich | 369/215 |
| 5,119,362 | 6/1992 | Yanagisawa | 369/215 |

FOREIGN PATENT DOCUMENTS

29465  2/1986  Japan .................................. 369/215
2080599A  2/1982  United Kingdom .

OTHER PUBLICATIONS

Patent Abstracts of Japn, vol. 9, No. 86 (P-349)(1809), 16 Apr. 1985 & JP-A-59 215 081 (Olympus Kogaku Kogyo K.K.), 3 Dec. 1984.

Primary Examiner—Richard A. Bertsch
Assistant Examiner—Roland G. McAndrews, Jr.
Attorney, Agent, or Firm—Philip M. Shaw, Jr.

[57] ABSTRACT

A translating apparatus for an optical pickup device comprises an optical pickup device for radiating an optical disc with a light beam, a rack member attached to the optical pickup device, a supporting device having a guide portion for guiding the optical pickup device along a diametrical direction of the optical disc, and a translating device including a gear attached to the supporting device and meshed with the rack member, a drive apparatus for rotating the gear and a releasing mechanism for releasing the gear and the rack from being meshed with each other when the optical pickup device is translated beyond a predetermined translating range.

6 Claims, 5 Drawing Sheets

TRANSLATING APPARATUS FOR AN OPTICAL PICKUP DEVICE

BACKGROUND OF THE INVENTION

1. Field of the Invention

The present invention relates to translating apparatus for an optical pickup device applicable to optical disc players such as an optical video disc player or the like and, more particularly, to a mechanism that translates an optical pickup device in the inner or outer diametrical direction of an optical disc, i.e.., a so-called rack and pinion system translating apparatus for an optical pickup device.

2. Description of the Related Art

Conventional optical pickup devices used in an optical video disc player, for example, operate to radiate a laser beam on a signal recording surface of an optical disc that is rotated at high speed. Then, the radiated laser beam that has been reflected on the optical disc is detected by a photodetector to thereby optically read out an information recorded on the signal recording surface of the optical disc. The information thus read out from the signal recording surface of the optical disc is converted into an electrical signal and thereby reproduced as an image or sound. The above optical pickup device is usually translated in the diametrical direction of the optical disc while the laser beam from the optical pickup device is tracing the tracks on the signal recording surface of the optical disc.

A swing arm system, a rack and pinion system, a belt drive system or linear motor system are known as a method of translating the optical pickup device in the diametrical direction of the optical disc. Of these systems, according to the translating method of the rack and pinion system, a rack is provided on the optical pickup device side and the rack is geared and moved by a pinion (drive gear) that is rotated by a feed motor in a decelerated fashion, whereby the optical pickup device is translated in the diametrical direction of the optical disc (see Japanese Published Utility Model Publication No. 2-29573, Japanese Laid-Open Utility Model Publication No. 58-62486, etc.).

However, the conventional optical pickup device translating apparatus of the rack and pinion system has a defect such that the optical pickup device is translated at high speed, i.e., the optical pickup device is recklessly translated by the feed motor to which an overcurrent is applied due to the influence of an electric circuit or the like in a drive system, for example, during the time translating apparatus is in adjustment. If the optical pickup device is translated recklessly, then the optical pickup device hits the chassis side at the innermost or outermost peripheral position of the optical disc so that the rack or pinion is damaged by an impulsive force applied thereto.

In order to protect the rack or pinion from being damaged, it has long been customary to avoid the impulsive force of the optical pickup device by using a shock absorbing material. However, if an impulsive force is beyond a certain limit, then the shock absorbing action of the shock absorbing material becomes ineffective, which unavoidably causes the rack or pinion to be damaged.

As another proposal for protecting the rack or pinion from being damaged, it has been customary to change the material of the rack or pinion or to enlarge the size of assembly parts so that the rack or pinion can endure the impulsive force. In this case, there is a limit in strength. Further, in a motor using a worm as an output shaft, when the optical pickup device is shocked, a worm and a worm wheel are locked so that an inverting operation of the driving system is disabled.

On the other hand, in the optical pickup device translating method of the belt transport system, the impulsive force of the optical pickup device is transmitted to the belt itself so that the belt is deteriorated earlier because the belt is extended. Also, assembly members such as a pulley or the like are needed in association with the belt, which increases the number of assembly parts.

OBJECTS AND SUMMARY OF THE INVENTION

Therefore, it is an object of the present invention to provide an improved translating apparatus for an optical pickup device in which the aforesaid shortcomings and disadvantages encountered with the prior art can be eliminated.

More specifically, it is an object of the present invention to provide a translating apparatus for an optical pickup device in which a driving system such as a rack, a pinion or the like can be prevented from being damaged when an optical pickup device is translated recklessly.

It is another object of the present invention to provide a translating apparatus for an optical pickup device in which a motor can be prevented from being disabled to rotate in the reverse direction when a gear is locked.

It is a further object of the present invention to provide a translating apparatus for an optical pickup device which is high in reliability.

According to an aspect of the present invention, there is provided a translating apparatus for an optical pickup device which comprises an optical pickup device for radiating an optical disc with a light beam, a rack member attached to the optical pickup device, a supporting device having a guide portion for guiding the optical pickup device along a diametrical direction of the optical disc, and a translating device including a gear attached to the supporting device, the gear being meshed with the rack member, a drive apparatus for rotating the gear and a releasing mechanism for releasing the gear and the rack member from being meshed with each other when the optical pickup device is translated beyond a predetermined translating range.

In accordance with the thus arranged apparatus for an optical pickup device, if the drive gear is rotated at high speed by an overcurrent applied to the motor and the optical pickup device is recklessly translated via the rack meshed with the gear in the innermost or outermost periphery of the optical disc so that the rack strikes at its end portion the chassis, then the drive gear meshed with the rack is stopped from rotating. Consequently, by a reaction force generated from an output gear so as to rotate the drive gear, the motor base plate having the motor mounted thereon is rotated about the engagement portion toward the outside of the rack against the spring force of the spring member, whereby the drive gear is released from being meshed with the rack and made free. Then, when the drive gear is released from the rack, the drive gear is moved toward the rack by the spring force of the above spring member via the motor base plate and meshed with the rack again. In this case, however, the drive gear is repeatedly released from the rack by the rotation in the outside of the motor base plate so that the drive gear is idled, thereby preventing the rack and the drive gear from being damaged when locked.

BRIEF DESCRIPTION OF THE DRAWINGS

A better understanding of the objects, features, and advantages of the invention can be gained from a consideration of the following detailed description of the preferred embodiment thereof, in conjunction with the figures of the accompanying drawings, wherein.

DETAILED DESCRIPTION OF THE PREFERRED EMBODIMENT

A translating apparatus for an optical pickup device according to an embodiment of the present invention will hereinafter be described with reference to the drawings.

Figure 1:
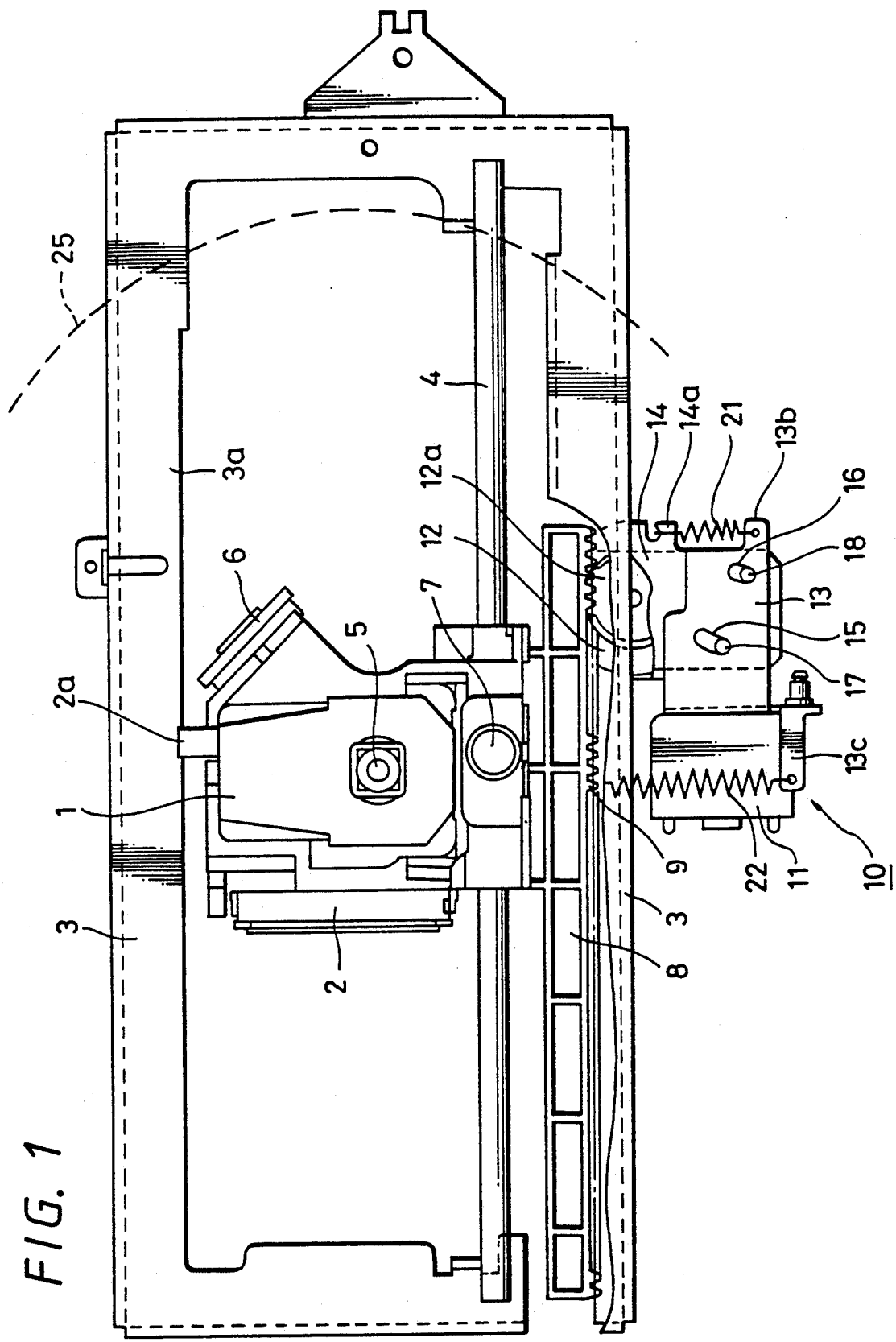
FIG. 1 is fragmentary cross-sectional plan view of a translating apparatus for an optical pickup device according to an embodiment of the present invention.

FIG. 1 of the accompanying drawings is a plan view showing an optical pickup device used in an optical video disc player and a translating apparatus for the optical pickup device according to the present invention in a fragmentary cross-sectional fashion.

As shown in FIG. 1, an optical pickup device depicted by reference numeral 1 is supported on a slider 2. The slider 2 can be translated together with the optical pickup device 1 because the slider 2 itself is moved along a guide rail 4 whose respective ends are supported to a pickup supporting frame member 3 serving as a chassis and an engagement portion 2a provided on the slider 2 also is moved along a rail 3 of the chassis in the inner and outer diametrical direction of an optical disc 25.

The optical pickup device 1 comprises an objective lens 5 for converging a laser beam emitted from a semiconductor laser serving as a light source on a signal recording surface (not shown) of the optical disc 25, a photodetector 6 for detecting a laser beam reflected on the signal recording surface of the optical disc 25, a biaxial actuator (not shown) for servo-controlling the objective lens 5 in the focusing and tracking directions and an optical system (not shown) for introducing the laser beam emitted from the semiconductor laser into the objective lens 5 and which also introduces the laser beam incident via the objective lens 5 and reflected on the signal recording surface of the optical disc 25 into the photodetector 6. The optical pickup device 1 includes on the side of the slider 2 opposing the optical disc 25 a tilt detector 7 which detects an inclination, i.e., skew of the optical disc 25. On the basis of an output signal from the tilt detector 7, the servo operation is effected so that one end of the pickup device support frame 3 is used as a fulcrum, its other end is moved toward and away from the optical disc surface and inclined relative to the optical disc surface, thereby adjusting the skew angle of the optical disc in order to allow the laser beam to become perpendicularly incident on the signal recording surface of the optical disc along an optical axis of the optical pickup device 1, i.e., objective lens 5.

A rack 8 is unitarily molded with the slider 2 in parallel to the guide rail 4 and a rack gear 9 is formed on the outer surface of the rack 8 along the longitudinal direction of the rack 8. The rack 8 is slid together with the slider 2 by a translating apparatus 10, which will be described below, thereby translating the optical pickup device 1.

As illustrated in FIG. 1, the translating apparatus 10 comprises a motor 11 serving as a drive source and a worm wheel 12 having a drive gear rotated by a drive force of the motor 11 to transport the rack 8 in a gear fashion. The arrangement of the translating apparatus 10 will be described more fully below.

The motor 11 is supported on a motor base plate 13, and the motor base plate 13 is pivotally supported by a mount 14 attached to the aforementioned pickup device support frame member 3 and which is horizontally elongated toward the front side of the rack 8.

Figure 2:
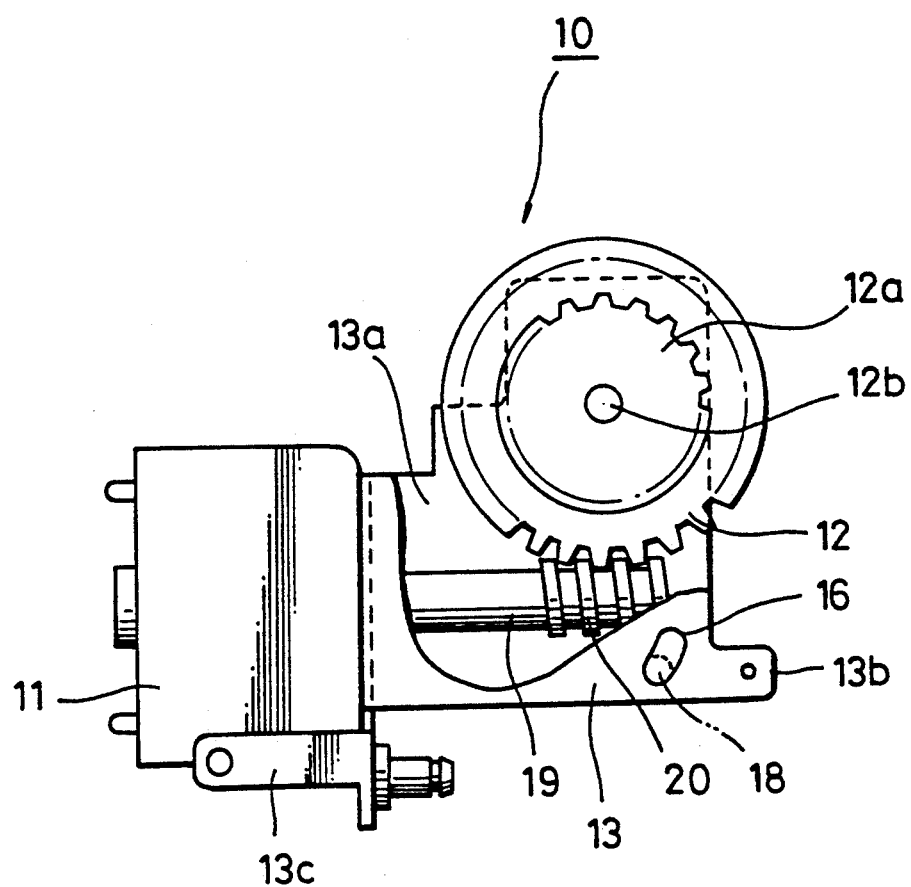
FIG. 2 is a fragmentary cross-sectional plan view of a motor and a worm wheel of the translating apparatus for an optical pickup device according to the embodiment of the present invention.

More specifically, as shown in FIG. 1, first and second elliptic apertures 15, 16 of different lengths are each bored through the motor base plate 13 in an opposing relation to each other in an arcuate fashion. First and second elliptic apertures 15, 16 are respectively rotatably supported by first and second shaft pins 17, 18 projected from the mount 14, thereby forming pivot portions. As shown in FIG. 2, a rotary shaft 12b of the worm wheel 12 is pivotally supported to a support base plate 13a unitarily elongated from the lower side of the motor base plate 13. The worm wheel 12 has a drive gear 12a coaxially rotatable therewith and whose diameter is smaller than that of the worm wheel 12. The worm wheel 12 is meshed with a worm 20 provided on an output shaft 19 of the motor 11, and the drive gear 12a is meshed with the rack teeth 9 of the rack 8 (see FIG. 2).

As to the motor base plate 13 and the mount 14, a first spring 21 is extended between hook portions 13b and 14a formed on both the motor base plate 13 and the mount 14 in the outside of the elliptic aperture 16. An outer end (lower end in FIG. 1) of the second elliptic aperture 16 is engaged with the second shaft pin 18 by a spring force of the first spring 21. Also, the worm 20 is spring-biased by the first spring 21 in the direction in which it is meshed with the worm wheel 12. Further, in the outside of the first elliptic aperture 15, a second spring 22 is extended between a supporting member 13c formed on the motor base plate 13 and the pickup device supporting frame member 3. Accordingly, an outer end (lower end in FIG. 1) of the first elliptic aperture 15 is engaged with the first shaft pin 17 by a spring force of the second spring 22. Also, the drive gear 12a of the worm wheel 12 is spring-biased toward the rack teeth 9 side.

Figure 3:
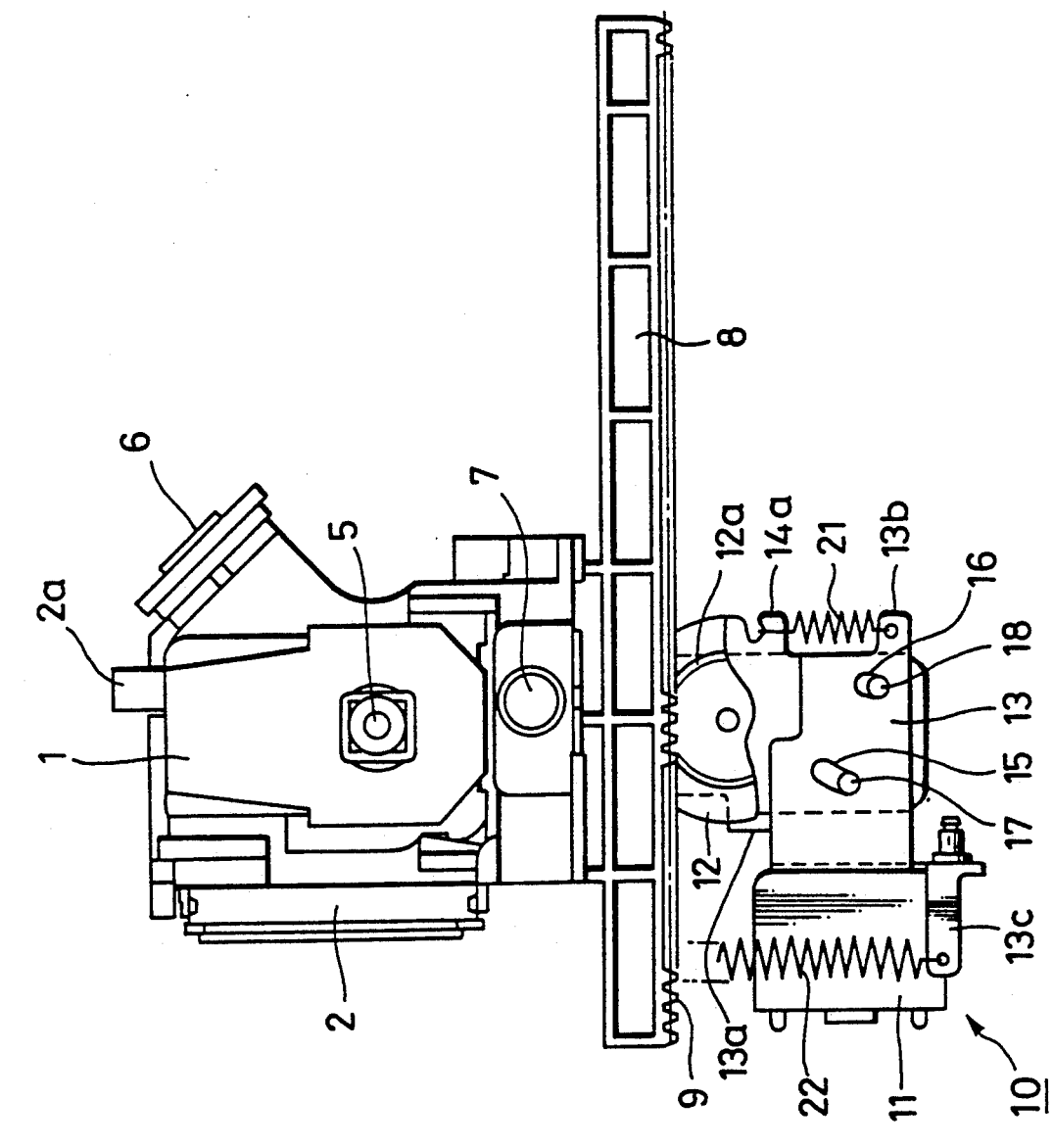
FIG. 3 is a diagram used to explain operation of the translating apparatus when an optical pickup is translated normally.
Figure 4:
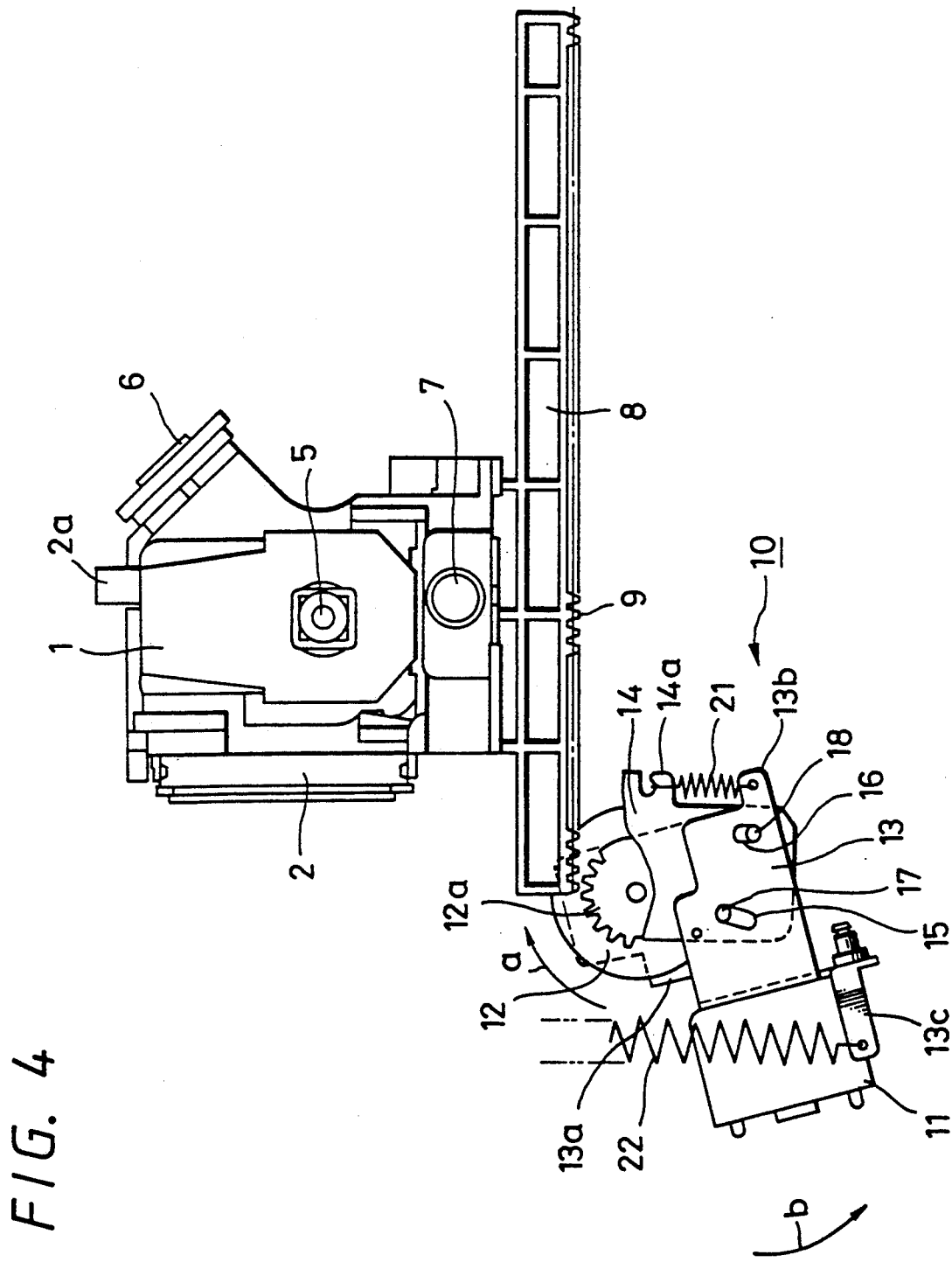
FIG. 4 is a diagram used to explain operation of the translating apparatus when the optical pickup device is recklessly translated toward the innermost periphery of the optical disc.
Figure 5:
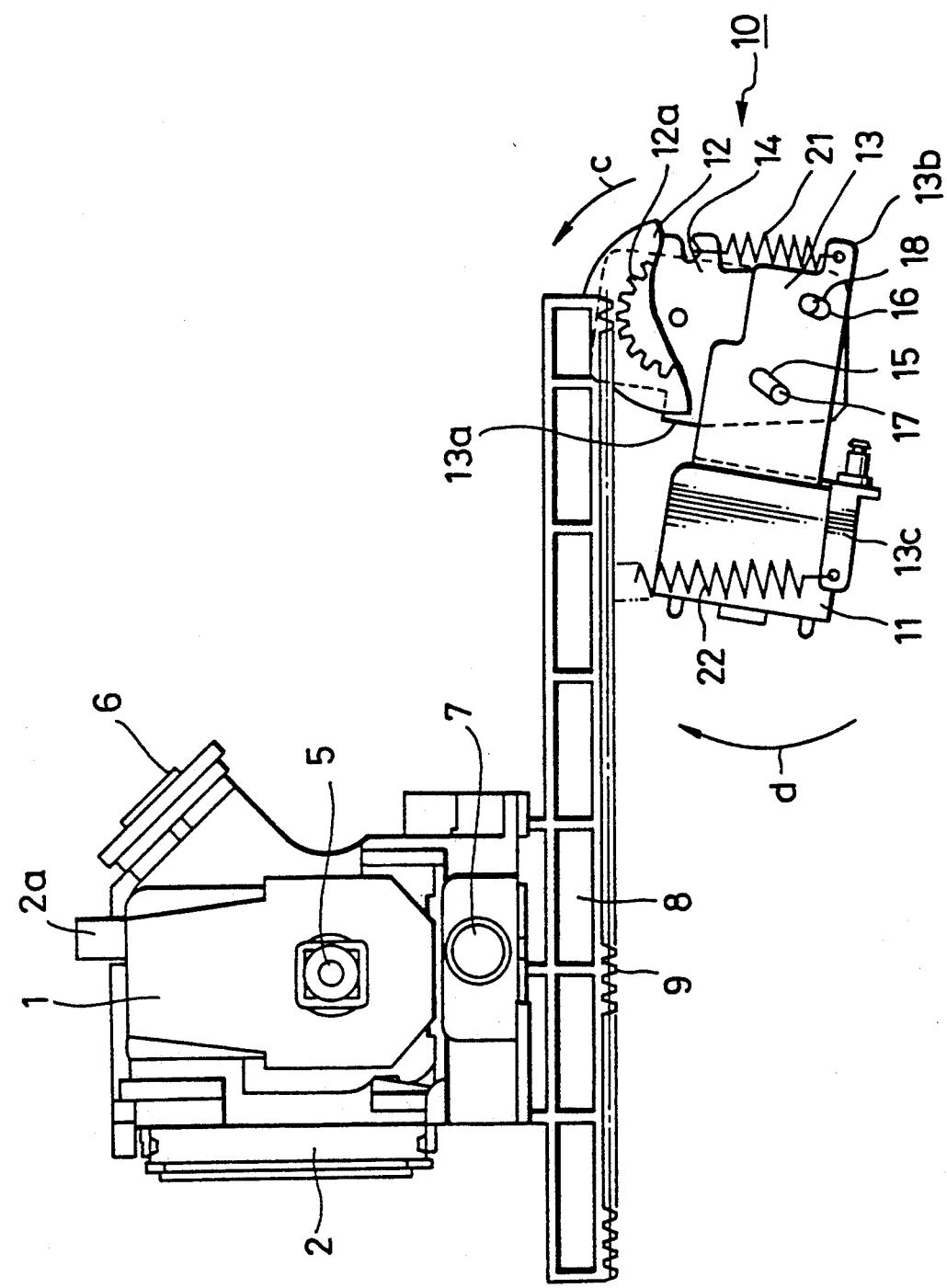
FIG. 5 is a diagram used to explain operation of the translating apparatus when the optical pickup device is recklessly translated toward the outermost periphery of the optical disc.

Referring to FIGS. 3 to 5, let us describe the operation of the translating apparatus when the optical pickup device is normally translated and the protecting operation of the translating apparatus when the optical pickup device is translated recklessly in the optical pickup device translating apparatus thus arranged.

Initially, the operation of the translating apparatus when the optical pickup device is thereby translated normally will be described below.

FIG. 3 of the accompanying drawings is a plan view used to explain a normal translating operation of the optical pickup device 1.

As shown in FIG. 3, the worm 20 provided on the motor output shaft 19 is spring-biased by the spring force of the first spring 21 and then meshed with the worm wheel 12, whereas the drive gear 12a is spring-biased by the spring force of the second spring 22 and then meshed with the rack teeth 9 of the rack 8. Accordingly, in this state, the drive force of the motor 11 rotates the worm wheel 12 meshed with the worm 20 formed on the output shaft 19 of the motor 11 to transport the rack teeth 9 meshed with the drive gear 12a, thereby translating the rack 8. Thus, the optical pickup device 1 is translated together with the slide 2 in the inner and outer diametrical direction of the optical disc not shown.

A protecting operation of the translating apparatus of the present invention when the optical pickup device 1 is recklessly translated in the innermost or outermost periphery of the optical disc will be described next with reference to FIGS. 4 and 5. FIG. 4 is a plan view used to explain the protecting operation of the translating apparatus when the optical pickup device 1 is translated toward the innermost periphery side of the optical disc, whereas FIG. 5 is a plan view used to explain the protecting operation of the translating apparatus when the optical pickup device 1 is translated toward the outermost periphery side of the optical disc.

With reference to FIG. 4, let us first describe the protecting operation of the translating apparatus when the optical disc 1 is recklessly translated toward the innermost peripheral side of the optical disc. In the stage in which the translating apparatus is adjusted on the maker side, when an overcurrent is flowed to the motor 11 due to the influence of the electric circuit or the like of the drive system, for example, causing the optical pickup device 1 to be translated at high speed, the optical pickup device 1 is recklessly translated to the innermost peripheral position of the optical disc so that the end portion of the rack 8 strikes the pickup device supporting frame member 3 (not shown in FIG. 4) and the rotation of the drive gear 12a meshed with the rack teeth 9 is stopped. As a result, by a reaction force generated from the worm 20 meshed with the worm wheel 12 so as to rotate the worm wheel 12 in the clockwise direction (direction shown by an arrow a in FIG. 4), the motor base plate 13 supporting the motor 11 is rotated about the second shaft pin 18 from the horizontal state shown in FIG. 3 against the spring force of the second spring 22 such that the first elliptic aperture 15 engaged with the first shaft pin 17 is moved from the outer end to the inner end. At the same time when the motor base plate 13 is operated as described above, the supporting base plate 13a unitarily formed with the motor base plate 13 is rotated in the direction shown by an arrow b in FIG. 4 in unison with the motor base plate 13, whereby the drive gear 12a is released from being meshed with the rack teeth 9 and made free as shown in FIG. 4. When the drive gear 12a has released from the rack teeth 9, the supporting base plate 13a and the worm wheel 12 are moved toward the rack 8 by the spring force of the second spring 22 that spring-biases the motor base plate 13 toward the rack 8 side, thereby bringing the drive gear 12a and the rack teeth 9 into a meshed state again. In this case, as described above, the drive gear 12a is repeatedly released from the track teeth 9 each time the motor base plate 13 is rotated by the reaction force of the worm 20. Consequently, the drive gear 12a is idled and hence the teeth of the rack teeth 9 and so on can be prevented from being damaged by the locked state between the drive gear 12a and the rack 8.

The protecting operation of the translating apparatus when the optical pickup device 1 is recklessly translated toward the outermost peripheral side of the optical disc will be described with reference to FIG. 5.

When the optical pickup device 1 is recklessly translated to the outermost peripheral position of the optical disc and strikes the pickup device supporting frame member (not shown in FIG. 5), the drive gear 12a meshed with the rack teeth 9 is prevented from rotating. As a consequence, by a reaction force generated from the worm 20 so as to rotate the worm wheel 12 in the counter-clockwise direction (direction shown by an arrow c in FIG. 5), the motor base plate 13 supporting the motor 11 is rotated about the first shaft pin 17 from the horizontal state shown in FIG. 3 such that the second elliptic aperture 16 engaged with the second shaft pin 18 is moved from the outer end to the inner end. At the same time when the motor base plate 13 is operated, the supporting base plate 13a unitarily formed with the motor base plate 13 is rotated in the direction shown by an arrow d in FIG. 5 in unison with the motor base plate 13, whereby the drive gear 12a is released from being meshed with the rack teeth 9 and made free as shown in FIG. 5. When the drive gear 12a has released from the rack teeth 9, the drive gear 12a is moved toward the rack 8 together with the supporting base plate 13a by the spring force of the first spring 22, thereby bringing the drive gear 12a and the rack teeth 9 into a meshed state again. However, similarly as described above, the drive gear 12a is repeatedly released from being meshed with the rack teeth 9 each time the motor base plate 13 is rotated by the reaction force of the worm 20, whereby the drive gear 12a is idled together with the worm wheel 12. Therefore, the teeth of the rack teeth 9 and so on can be prevented from being damaged by the locking between the drive gear 12a and the rack 8 similarly as described before.

As described above, according to the optical pickup device translating apparatus of the present invention, even when the optical pickup device is recklessly translated by the overcurrent applied to the motor 11 due to the influence of the electric circuit or the like in the driving system at the adjustment stage of the translating apparatus and strikes the chassis, the drive gear 12a can be readily released from being engaged with the rack 8. Therefore, the rack 8 and the drive gear 12a can be protected from being damaged.

Further, according to the optical pickup device translating apparatus of the present invention in which the worm 20 is provided on the output shaft of the motor 11, even if the motor 11 cannot be rotated in the reverse direction because the worm wheel 12 and the rack 8 are brought into engagement (locked with each other) when a starting torque is made insufficient by the pull-up on the more core side, for example, then the drive gear 12a is idled with respect to the rack 8 due to the similar action mentioned above so that the drive gear 12a can be released from being meshed with the rack 8. Therefore, the motor 11 can be avoided from being disabled to rotate in the reverse direction.

Furthermore, while the protecting operation done by the optical pickup device translating apparatus according to the present invention when the optical pickup device is recklessly translated has been described so far, the present invention is not limited thereto and can be operated as a translating apparatus protecting mechanism that can protect the optical pickup device translating apparatus when the optical pickup device is translated at high speed during the access such as to find out a starting portion of contents recorded on the optical disc, for example.

Moreover, while the worm wheel is used as the drive gear which is meshed with the rack 8 to translate the optical pickup device 1 as described above, the present invention is not limited thereto and other gear devices may be used insofar as they can be rotated by the drive force of the motor 11 to thereby translate the rack 8.

While the motor base plate 13 and the mount 14 are coupled by means of the shaft pins 17, 18 and the elliptic apertures 15, 16 as described above, the present invention is not limited thereto and the two elliptic apertures 15, 16 may be modified as a single aperture by connecting respective outer edges with tangential lines with similar action being obtained.

In addition, while the translating apparatus for an optical pickup device is applied to the optical video disc player as described above, the present invention is not limited thereto and may be applied to a wide variety of other optical disc players such as a so-called compact disc player or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A translating apparatus for an optical pickup device comprising:
   (a) optical pickup means for radiating an optical disc with a light beam;
   (b) a rack member attached to said optical pickup means;
   (c) supporting means having a guide portion for guiding said optical pickup means along a diametrical direction of the optical disc;
   (d) translating means including a gear attached to said supporting means and meshed with said rack member, drive means for rotating said gear and releasing means for releasing said gear and said rack member from being meshed with each other when said optical pickup means is translated beyond a predetermined translating range; and
   (f) an attaching member for attaching said translating means to said supporting means so that said translating means become freely rotatable relative to said supporting means and spring-biasing means for spring-biasing said translating means in a direction in which said translating means is engaged with said rack member.

2. The translating apparatus for an optical pickup device according to claim 1, wherein said releasing means rotates said translating means in a direction in which said translating means is moved away from said rack member on the basis of a drive force from said driving means.

3. The translating apparatus for an optical pickup device according to claim 2, wherein said releasing means includes a worm gear and a worm wheel for transmitting the drive force from said drive means to said gear.

4. A translating apparatus for an optical pickup device comprising:
   (a) optical pickup means for radiating an optical disc with a light beam;
   (b) a rack member attached to said optical pickup means;
   (c) supporting means having a guide portion for guiding said optical pickup means along a diametrical direction of the optical disc;
   (d) translating means including a gear attached to said supporting means and meshed with said rack member, drive means for rotating said gear and releasing means for releasing said gear and said rack member from being meshed with each other when said optical pickup means is translated beyond a predetermined translating range; and
   (e) attaching means for attaching said translating means to said supporting means so that said translating means becomes freely rotatable relative to said supporting means, wherein said attaching means further includes spring-biasing means for spring-biasing said translating means in a direction in which said translating means is engaged with said rack member.

5. The translating apparatus for an optical pickup device according to claim 4, wherein said attaching means includes a fulcrum as a rotating start point for said translating means and restricting means for restricting a rotating amount of said translating means.

6. The translating apparatus for an optical pickup device according to claim 4, wherein said releasing means rotates said translating means in a direction in which said translating means is moved away from said rack member on the basis of a drive force from said driving means.

* * * * *